US007878790B2

(12) United States Patent
Kidd

(10) Patent No.: US 7,878,790 B2
(45) Date of Patent: Feb. 1, 2011

(54) TOOL TO CRIMP NON-METALLIC TUBING ONTO FITTINGS

(76) Inventor: Bruns Daniel Kidd, 29 Kidd Rd., Limington, ME (US) 04049

( * ) Notice: Subject to any disclaimer, the term of this patent is extended or adjusted under 35 U.S.C. 154(b) by 700 days.

(21) Appl. No.: 11/665,105

(22) PCT Filed: Sep. 22, 2006

(86) PCT No.: PCT/US2006/037048

§ 371 (c)(1),
(2), (4) Date: Apr. 10, 2007

(87) PCT Pub. No.: WO2007/038308

PCT Pub. Date: Apr. 5, 2007

(65) Prior Publication Data

US 2009/0013835 A1 Jan. 15, 2009

Related U.S. Application Data

(60) Provisional application No. 60/720,241, filed on Sep. 23, 2005.

(51) Int. Cl.
*B29C 43/32* (2006.01)

(52) U.S. Cl. ....................... 425/318; 425/442; 72/409.1

(58) Field of Classification Search ................. 425/318, 425/411, 442; 72/409.1, 472; 29/237, 268, 29/270
See application file for complete search history.

(56) References Cited

U.S. PATENT DOCUMENTS

| | | | | |
|---|---|---|---|---|
| 318,006 | A | 5/1885 | Martin | 86/22 |
| 839,651 | A | 12/1906 | Sayer | 470/191 |
| 2,728,133 | A | 12/1955 | Andersen | 72/331 |
| 2,774,269 | A | 12/1956 | Demler | 72/472 |
| 2,930,836 | A | 3/1960 | Floyd, Jr. | |
| 3,791,189 | A * | 2/1974 | Lawson | 72/409.16 |
| 4,429,451 | A | 2/1984 | Angelico | 29/566.4 |
| 4,536,958 | A * | 8/1985 | Tosi | 30/120.3 |
| 4,538,443 | A | 9/1985 | Gooding | 72/416 |
| 4,548,118 | A * | 10/1985 | Brosch | 83/522.24 |
| 5,697,135 | A | 12/1997 | Dischler | 29/237 |
| 6,044,681 | A | 4/2000 | Frenken | 72/292 |
| 6,477,757 | B2 | 11/2002 | Viegener | 29/237 |
| 6,694,586 | B1 | 2/2004 | Goop | 29/234 |

(Continued)

FOREIGN PATENT DOCUMENTS

| | | |
|---|---|---|
| CA | 2437612 | 2/2005 |

(Continued)

OTHER PUBLICATIONS

ASTM Standard Specification F1807-09 for Metal Insert Fittings Utilizing a Copper Crimp Ring for SDR9 Cross-Linked Polyethylene (PEX) Tubing Dec. 1, 2009.

(Continued)

*Primary Examiner*—Richard Crispino
*Assistant Examiner*—Thu Khanh T Nguyen
(74) *Attorney, Agent, or Firm*—Nils Peter Mickelson

(57) ABSTRACT

A low-cost crimping tool is provided for crimping non-metallic tubing such as PEX tubing connections. The tool includes two primary pieces which fit together forming an integral pivot without being pinned together about which the tool may be closed with pliers to form a secure tubing connection.

2 Claims, 6 Drawing Sheets

U.S. PATENT DOCUMENTS

| | | | | |
|---|---|---|---|---|
| 6,729,009 | B2 | 5/2004 | Goop | 29/516 |
| 6,923,037 | B2 | 8/2005 | Bowles et al. | 72/416 |
| 7,059,166 | B2 | 6/2006 | Bowles et al. | 72/413 |
| 2005/0186536 | A1 * | 8/2005 | Zepf | 433/159 |

FOREIGN PATENT DOCUMENTS

| | | | |
|---|---|---|---|
| CA | 2470139 | | 12/2005 |
| CA | 2553144 | | 1/2008 |
| DE | EP 1839814 | A2 * | 10/2009 |

OTHER PUBLICATIONS

Tyco Electronics Application Specification 114-2157 for Pre-Insulated Diamond Grip (PIDG) Terminals, Splices and End Caps Aug. 1, 2006.

Sleeve-Lock Universal Tool for Watertight Pipe Connection—sales page Website: http://www.sleevelock.ca/en/index.html, 2005.

PEX Pocket Crimper—sales page.

International Preliminary Report on Patentability (Mar. 26, 2008) 4 pages.

* cited by examiner

TOOL TO CRIMP NON-METALLIC TUBING ONTO FITTINGS

CROSS-REFERENCE TO RELATED APPLICATIONS

The present application claims the priority benefit of U.S. Provisional Patent Application 60/720,241 filed 2005 Sep. 23 by the same inventor. The entire content of that application is incorporated herein by reference.

STATEMENT REGARDING FEDERALLY SPONSORED RESEARCH OR DEVELOPMENT

Not applicable

FIELD OF THE INVENTION

This invention relates to an improvement on tools for crimping non-metallic tubing, including plastic tubing, especially cross-linked polyethylene (PEX) tubing.

BACKGROUND OF THE INVENTION

As with all technologies, the art of plumbing continues to evolve, and with it the tools for effecting it. Currently popular is the use of non-metallic tubing to supplant copper tubing and formerly cast iron pipe in distributing hot, cold and potable water throughout a building. Where iron pipe was threaded and copper pipe was soldered, the polymers used in non-metallic tubing lend themselves well to neither of these connection methods.

Consequently, clamps or compression fittings which can be effected at room temperature are used most commonly to join non-metallic tubing. One such technique, used with plastic tubing, particularly PEX tubing, is to compress or crimp a malleable band around the tubing to create a leak-proof joint. When it was a comparatively new and initially unproven technology, the use of PEX tubing called for new tools and new testing standards before its crimped connections could become trusted and widely used.

These tools are today widely known in the prior art, some of which is discussed below, but all share in common one principle of operation: they all work to compress the malleable band uniformly around its entire circumference. Consequently, they all, in essence, comprise a pair of limber C-shaped crimping sections built uniquely for one single size of tubing. Some comprise more than just two crimping sections, linked together as a chain around the joint to be crimped. They act in concert with a separate power tool or a specialized pliers-like actuator which closes the C-shaped sections around the band and then, by tensile stresses in the sections, compress the band inward. Many elaborations on this theme have evolved, to guarantee precise, proper and complete compression and to afford different actuation mechanisms. A consequence of all this development has been that the available tooling is both cumbersome and expensive.

U.S. Pat. No. 6,923,037 to Bowles et al., and U.S. Pat. No. 6,477,757 to Viegener disclose details of the complexity of typical actuators. U.S. Pat. No. 6,044,681 to Frenken illustrates a three-segment crimping tool, while U.S. Pat. No. 5,697,135 to Dischler is exemplary of a 5-segment tool. Recently granted U.S. Pat. No. 7,059,166 to Bowles et al. reinforces the currency and commonplace use of C-shaped crimping sections and the delicate, complex measures which are needed in properly closing their sections to effect an adequately crimped connection.

BRIEF SUMMARY OF THE INVENTION

By comparison, the crimping tool described herein is simple, highly convenient to carry and use, well adapted to crimping in cramped locations, and low in cost. Its use obviates the need for elaborate actuators and instead uses commonplace Vise-Grip® pliers, such as are commercially available and offered by Irwin Industrial Tool Company and carried ubiquitously by every plumber or handyman, to effect the crimp. Furthermore, the crimping tool can be used universally for several common diameters of tubing.

OBJECT OF THE INVENTION

Accordingly, several objects and advantages of my invention are to provide a much simpler and more convenient crimping tool, rugged, easy to carry on-the-job in a pocket or tool pouch, and readily closed with common Vise-Grip®-like pliers. Other objects are to provide one tool which may be used on several sizes of tubing, so that separate tools are not necessary. Other advantages will become apparent from the drawings and description that follows.

REFERENCE NUMERALS USED IN DRAWINGS

Figure 1:
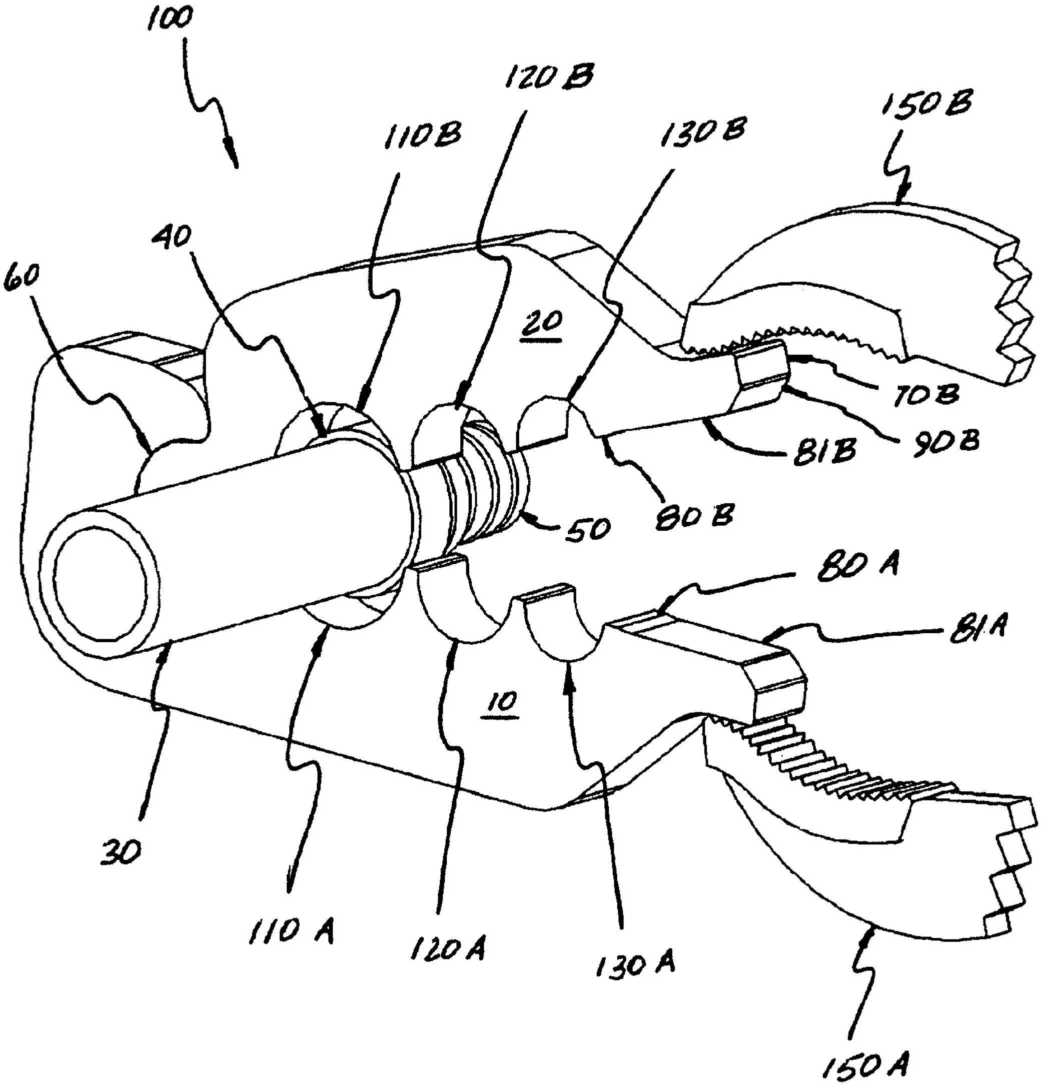
FIG. 1 is a perspective view of the preferred embodiment of the crimping tool.

The following reference numerals correspond to the following items:

10 first crimping jaw
11 top beam surface
12 bottom beam surface
20 second crimping jaw
21 top beam surface
22 bottom beam surface
30 non-metallic tubing
40 crimp ring
50 fitting
60 pivot
61 cylindrical cavity
62 cylindrical protrusion
70 end
80 stop
81 relief
90 chamfer
100 crimping tool assembly
110 first crimping die
120 second crimping die
130 third crimping die
140 lands
150 Vise-Grip® pliers

DETAILED DESCRIPTION OF THE INVENTION

A general perspective view of the crimping tool assembly 100 in its preferred embodiment may be seen at FIG. 1, showing a first crimping jaw 10 and a second crimping jaw

20, which together form the primary components of the crimping tool assembly 100. These two crimping jaws 10 and 20 slide together and engage to form a pivot at 60. Shown also are a multiplicity of crimping dies 110, 120 and 130, each of which is configured for one unique size of tubing connection. Noteworthy is the fact that the largest crimping die 110 is closest to pivot 60, and that progressively smaller dies at 120 and 130 are progressively further from pivot 60.

Included for reference in FIG. 1 is a length of non-metallic tubing 30, which may be PEX tubing and which may be arbitrarily long, a crimp ring 40 and a fitting 50. It should be noted that fitting 50 is characteristic of an entire family of plumbing fittings such as tees, elbows, nipples, adapters, splices and so forth well known in the trade, all of which may be used with the invention. As shown, fitting 50 represents a straight connecting nipple, half of which may be seen, and the other half of which extends inside the tubing 30 and against which the crimp ring 40 will compress the tubing. The visible end of fitting 50 would typically be later crimped to a second length of non-metallic tubing similar to tubing 30.

Also included for reference in FIG. 1 are plier jaws 150A and 150B characteristic of a typical set of Vise-Grip® or similar locking pliers 150, such as taught in 1938 U.S. Pat. No. 2,201,918 to Petersen. These jaws 150A and 150B are shown in their open position, prepared to actuate the crimping tool assembly 100. Although these plier jaws 150A and 150B are for clarity shown aligned linearly with the crimping tool assembly 100, it can be easily understood that the force they apply to ends 70 can be effected even if the pliers are applied perpendicular to the tool assembly 100, or indeed at any arbitrary angle. This facilitates using the tool assembly 100 in tight quarters, such as adjacent to a wall, a joist or some other obstacle.

From FIG. 1 it's readily evident that as plier jaws 150A and 150B move closer together, first crimping die sections 110A and 110B also move closer together, at first merely contacting and closing upon crimp ring 40, but then gradually closing about crimp ring 40 entirely, and ultimately forging it into a diameter completely conforming to die sections 110A and 110B when closed together. Because die sections 110A and 110B are closer to pivot 60 than are the ends 70 where force is applied, the forces exerted at die sections 110A and 110B upon crimp ring 40 are much greater than the already substantial force applied by plier jaws 150. It can be appreciated that the forces which would be applied to a smaller crimp in dies 120 in 130 are progressively less than those at dies 110, commensurate with the lesser forces needed to crimp such a smaller ring.

Figure 2:
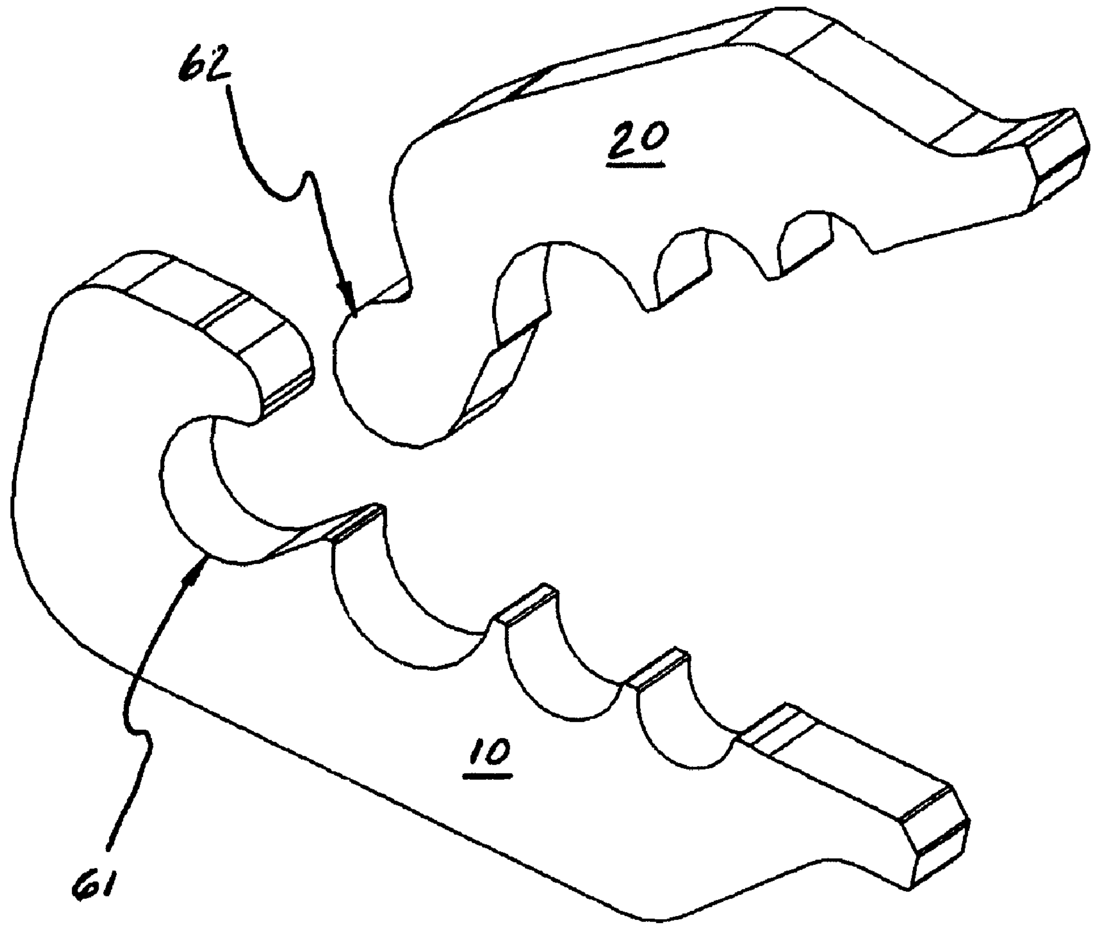
FIG. 2 is a perspective view of the tool, as disassembled.

What can also be seen in FIG. 1, but is best appreciated in FIG. 2, is the separability of first and second crimping jaws 10 and 20 from one another by simply sliding them apart at pivot 60. This unique feature allows each jaw separately to be arranged around a crimp ring 40, even in very tight quarters, assembled by sliding together again, and completing the crimping operation. Not having loose parts such as hinge pins, bolts or springs is here a great advantage, in that each jaw is complete unto itself, allowing the crimping tool assembly 100 to be managed easily with two hands and without the risk of dropping small parts, particularly if the plumber is working on a ladder and over a cluttered or irregular floor. Functionally, of course, a separate pin fit through both jaws could form pivot 60.

Figure 3:
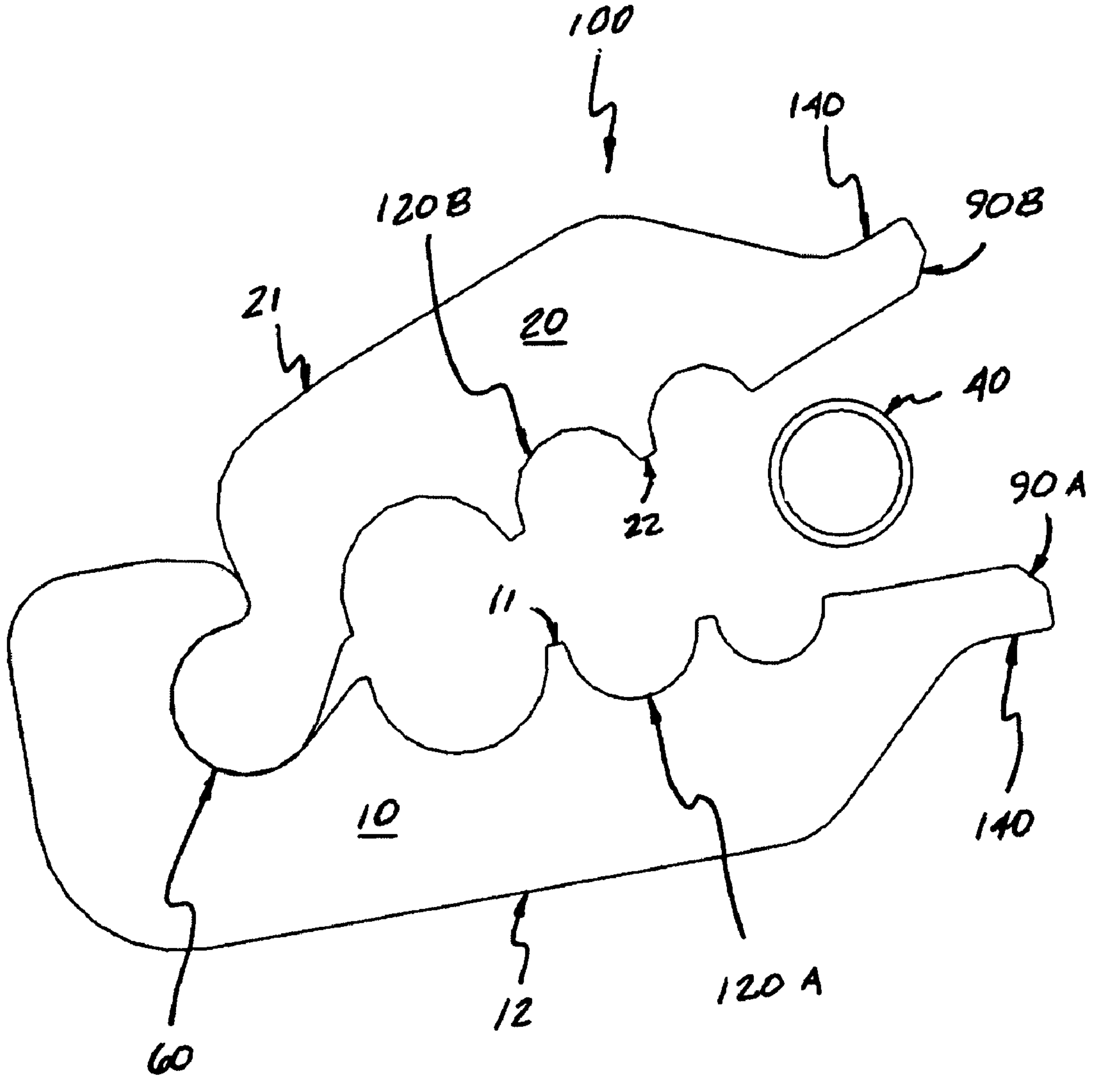
FIG. 3 is a plan view of the tool in its open-most position.

FIG. 3 is a plan view of the crimping tool assembly 100 in its openmost position, showing where first and second crimping jaws 10 and 20 abut near pivot 60. It can be seen that a crimp ring 40 of a size appropriate to crimping die 120 may be conveniently inserted into the crimping tool assembly 100 directly, between ends 70, without disassembling the tool assembly 100. Chamfers 90 may be provided, to help ease ends 70 around the ring 40.

Figure 4:
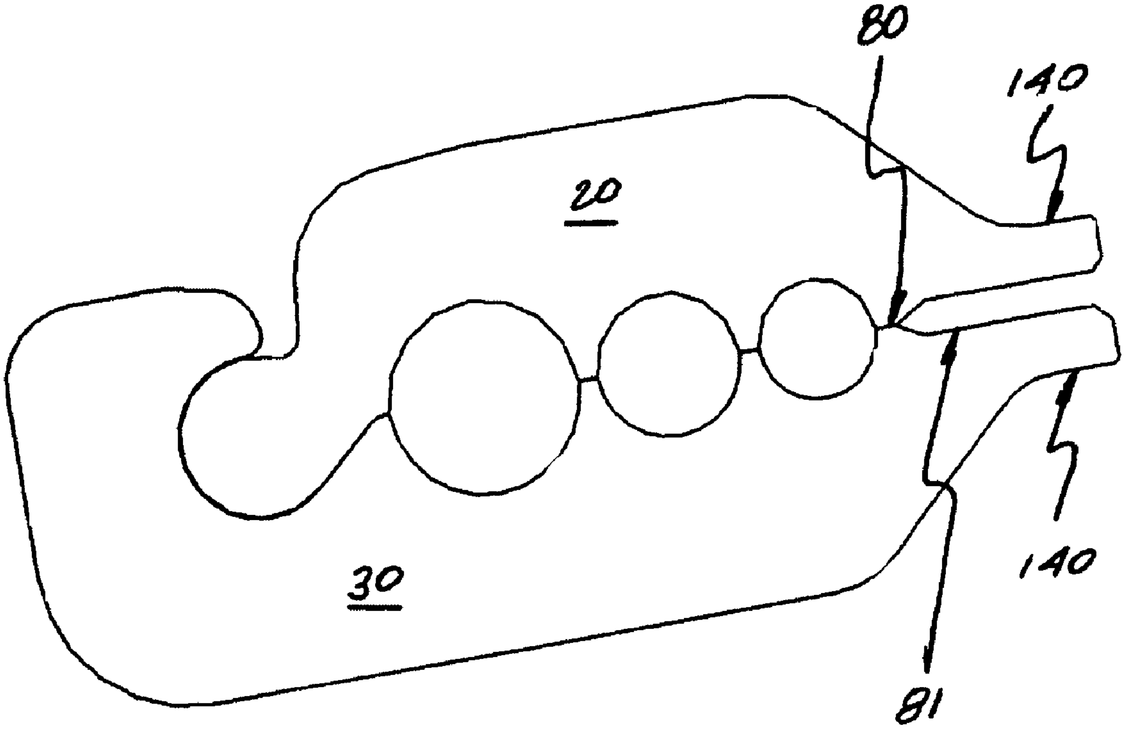
FIG. 4 is a plan view of the tool in its closed configuration.

In its most closed position, as shown in FIG. 4, stops 80 make abutting contact, assuring that the tool assembly 100 is fully closed and assuring that excessive closure cannot occur, resulting in damage to the crimped connection. A relief 81 can be provided between ends 70A and 70B so that a prying tool such as a screwdriver may be inserted to open the first and second crimping jaws 10 and 20, should it become necessary.

Figure 5:
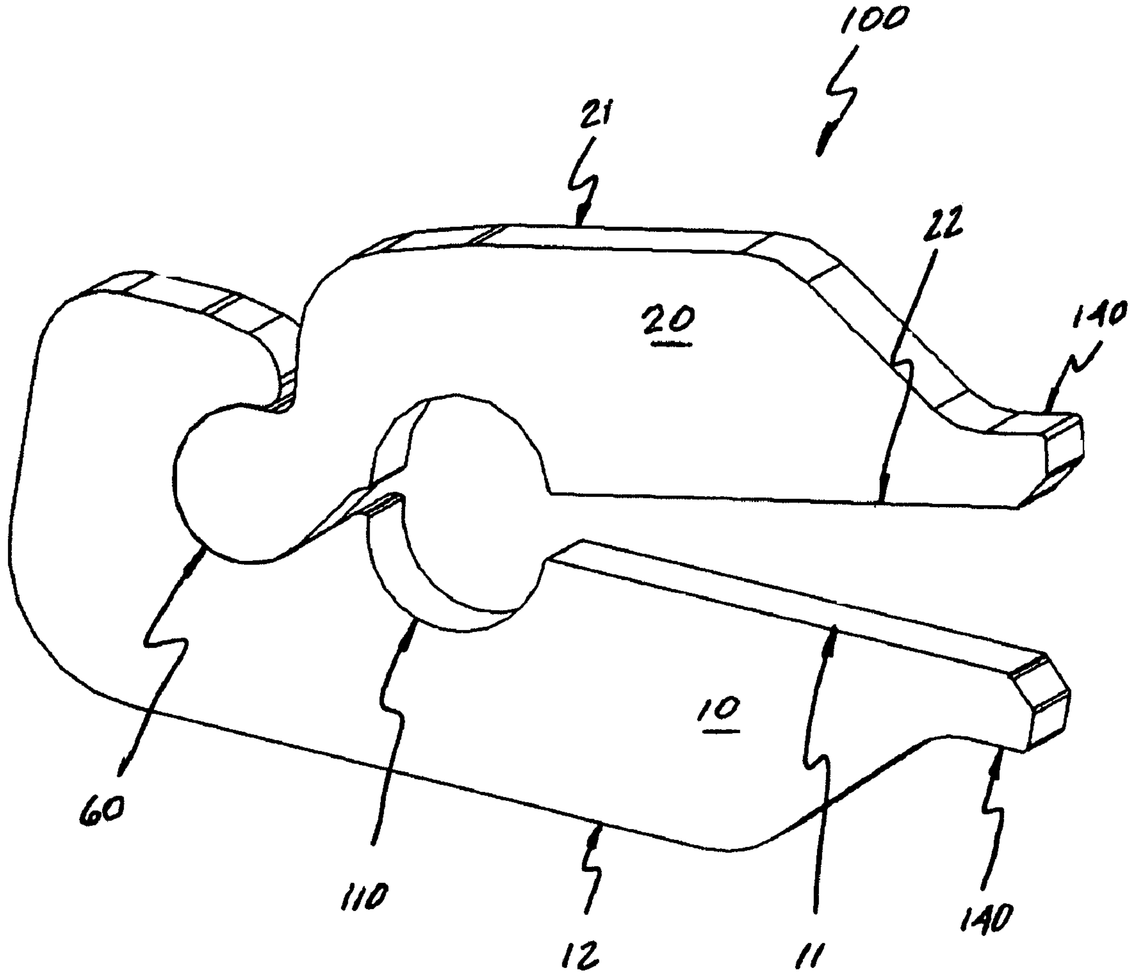
FIG. 5 is a perspective view of an alternative embodiment of the tool.

FIG. 5 illustrates a variation of the crimping tool that accommodates only one single size of crimped connection. In this most-simplified configuration, the straight, elongated flat faces of top beam surfaces 11 and 21, and bottom beam surfaces 12 and 22, of each crimping jaw, 10 and 20, can clearly be distinguished from the arched and curved surfaces of the C-shaped crimping bands known in similar existing devices. Evident also is the manner in which cylindrical protrusion 62 of second jaw 20 fits within cylindrical cavity 61 of first jaw 10, providing a much more robust pivot 60 than is afforded by the much smaller pins and bolts used in prior devices. Frictional wear is thus distributed over a wider area and is thereby greatly reduced.

Lands 140 provided at the far ends of each crimping jaw 10 and 20 can be seen as ideally adapted for gripping and closure by pliers, as compared to the elegant and complex ends customary in the prior devices. By extending crimping jaws 10 and 20 far beyond crimping die 110, a substantial mechanical advantage is gained over prior devices. In the preferred embodiment shown, this advantage is approximately 3.6-to-1, whereas prior devices provide little more than a 2-to-1 advantage. A standard set of 10-inch Vise-Grip®-type pliers, coupled with this advantage, provides more than adequate force to complete a properly-dimensioned crimp connection.

Figure 6:
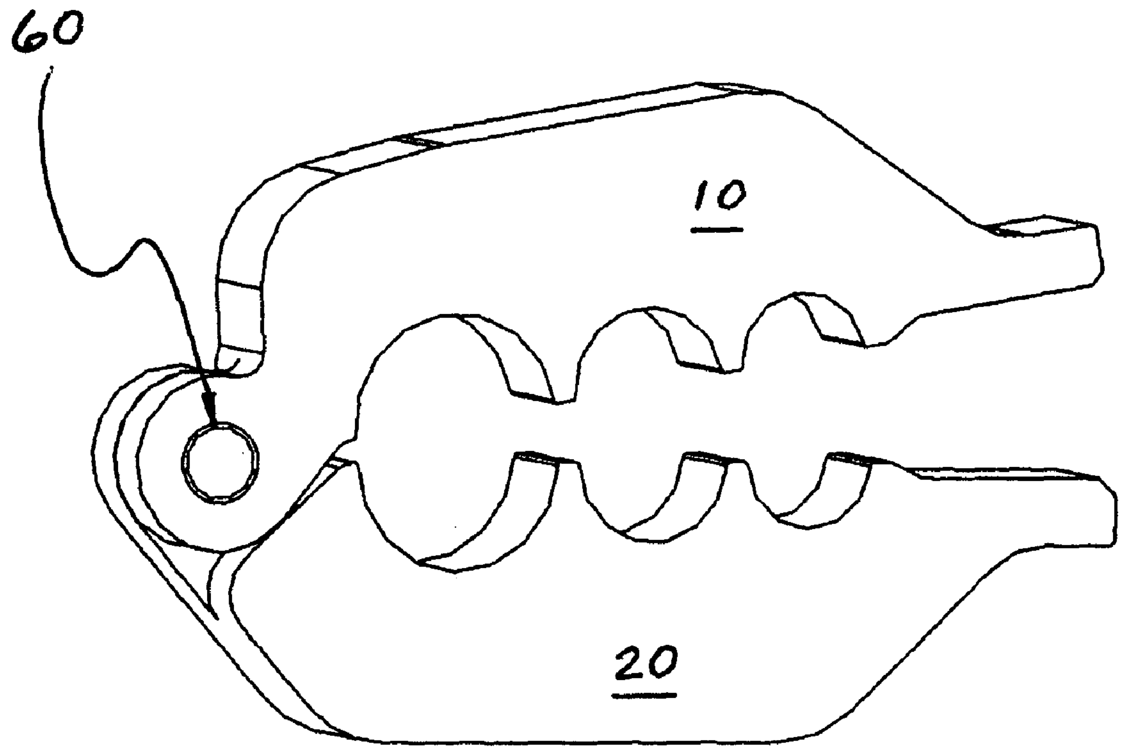
FIG. 6 illustrates an alternative pivot construction.

FIG. 6 illustrates a variation of the crimping tool showing an alternate construction of pivot 60. In this variation, cylindrical protrusion 62 of second jaw 20 fits within cylindrical cavity 61 of first jaw 10, providing a more robust pivot 60 than is afforded by the much smaller pins and bolts used in prior devices. In this construction, protrusion 62 may be a separable pin or and integral part of jaw 20.

In all these views, it can well be understood that crimping jaws 10 and 20 are rigid beams acting as levers, with a fulcrum at pivot 60, a force toward opening exerted by the crimped ring 40 and a force toward closing exerted on ends 70 by plier jaws 150. This beam action is structurally and functionally different from, and much simpler to use than, the prior techniques of crimping the ring by drawing a noose around it involving assembly pins, bolts, springs, elaborate actuators, position sensors and the like.

Unlike existing equipment and methods for crimping non-metallic tubing with tubing connectors, the tool assembly 100 may be purchased as a simple hand tool like a screwdriver or a pair of pliers. Where prior devices dictated expensive and cumbersome lever arms or the need to use hydraulic equipment, tool assembly 100 simply slips over a joint and is closed using ubiquitous Vise-Grip® pliers or the like. Crimping tool assembly 100 is a two-piece tool formed of high-strength steel or comparable material, the two pieces of which are assembled in place around a joint to be crimped and then closed together with pliers applied at any convenient angle to the tool assembly 100 at ends 70. The tool assembly 100 is simple in design, adaptable to several sizes of tubing, of inherently rugged and low-cost construction, and compact enough to easily be carried in a pocket or a small toolbox.

From the foregoing description, it can be appreciated that this invention affords a low cost, convenient crimping tool that can be used to make effective crimp connections in non-metallic tubing such as PEX tubing. It can also be appreciated that numerous modifications to the examples disclosed can be made within the claims of the invention which follow.

I claim:

1. A crimping tool for use in crimping a connector crimp ring with non-metallic tubing, said tool comprising:

a. a first jaw, substantially straight and elongate in shape and comprising a forming surface for crimping a crimp ring of a pre-determined size; and b. a second jaw, substantially straight and elongate in shape and comprising an opposing forming surface for crimping said crimp ring of pre-determined size;

said first and second jaws being pivotally connected at a first end and each having a distal second end remote from said first end, said forming surface and said opposing forming surface being placed at a predetermined distance from said first end; said elongate first and second jaws extending beyond said forming surfaces by a distance substantially greater than said predetermined distance, creating thereby a substantial mechanical advantage, and said distal second ends provided with lands adapted for being squeezed together with pliers, wherein each of said first and second jaws further includes a chamfer at said distal end, said chamfers providing an entry for inserting said crimp ring therein.

2. A crimping tool for use in crimping a connector crimp ring with non-metallic tubing, said tool comprising:

a. a first jaw, substantially straight and elongate in shape and comprising a plurality of forming surfaces for crimping crimp rings of pre-determined sizes;

b. a second jaw, substantially straight and elongate in shape and comprising a plurality of opposing forming surfaces for crimping crimp rings of pre-determined sizes; and said first and second jaws being pivotally connected at a first end and each having a distal second end remote from said first end, said forming surfaces and said opposing forming surfaces being placed at predetermined distances from said first end;

said elongate first and second jaws extending a distance substantially beyond said forming surfaces, creating thereby a substantial mechanical advantage; and said distal second ends having lands adapted for being squeezed together with pliers, wherein each of said first and second jaws further includes a chamfer at said distal end, said chamfers providing an entry for inserting said crimp rings therein.

* * * * *